(12) United States Patent
Margatan et al.

(10) Patent No.: US 10,284,622 B2
(45) Date of Patent: May 7, 2019

(54) IDENTIFYING AND PUBLISHING COMPANY MILESTONES IN RESPONSE TO EVENTS GENERATED FROM A SOCIAL NETWORKING SERVICE

(71) Applicant: Microsoft Technology Licensing, LLC, Redmond, WA (US)

(72) Inventors: James Margatan, San Jose, CA (US); Aviad Pinkovezky, Los Altos, CA (US); Arthur Switalski, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 15/142,375

(22) Filed: Apr. 29, 2016

(65) Prior Publication Data
US 2017/0318074 A1 Nov. 2, 2017

(51) Int. Cl.
*G06N 7/00* (2006.01)
*G06Q 10/04* (2012.01)
*G06Q 10/06* (2012.01)
*G06Q 30/02* (2012.01)
*G06Q 50/00* (2012.01)
*H04L 29/08* (2006.01)
*G06F 16/9535* (2019.01)

(52) U.S. Cl.
CPC .......... *H04L 67/02* (2013.01); *G06F 16/9535* (2019.01); *G06N 7/005* (2013.01); *G06Q 10/04* (2013.01); *G06Q 10/06393* (2013.01); *G06Q 30/0241* (2013.01); *G06Q 50/01* (2013.01); *H04L 67/22* (2013.01)

(58) Field of Classification Search
CPC ... H04L 67/02; H04L 67/22; G06F 17/30528; G06F 17/30864; G06N 7/005
USPC ......................................................... 709/205
See application file for complete search history.

(56) References Cited

U.S. PATENT DOCUMENTS

| 9,483,806 | B2 * | 11/2016 | Hosseini ............ G06Q 30/0269 |
| 9,769,098 | B1 * | 9/2017 | Snow ...................... H04L 51/12 |
| 2012/0136985 | A1 * | 5/2012 | Popescu ................. G06Q 10/10 709/224 |
| 2013/0346329 | A1 * | 12/2013 | Alib-Bulatao ......... G06Q 10/06 705/319 |

(Continued)

*Primary Examiner* — James E Springer
(74) *Attorney, Agent, or Firm* — Schwegman Lundberg & Woessner, P.A.

(57) ABSTRACT

This disclosure is directed to monitoring events generated by a social networking service and determining whether the generated events signify a company milestone for an organizational member. The events may be generated by members of the social networking service or by external websites being monitored by the social networking service. The social networking service further conducts various types of processing on content associated with one or more of the events to determine the quality, tone, and relevancy of the monitored events. This processing may depend on whether the event was generated by a member of the social networking service or by an external website. The social networking service then correlates the various monitored events with organizational members of the social networking service. After a predetermined time period or a predetermined number of events, the social networking service then attempts to identify a company milestone that best matches the events.

17 Claims, 8 Drawing Sheets

(56) References Cited

U.S. PATENT DOCUMENTS

| | | | |
|---|---|---|---|
| 2014/0278638 A1* | 9/2014 | Kreuzkamp | G06Q 10/06398 705/7.15 |
| 2015/0046543 A1* | 2/2015 | Childress | H04L 67/22 709/206 |
| 2016/0092996 A1* | 3/2016 | Bansal | G06Q 50/01 705/317 |
| 2016/0253766 A1* | 9/2016 | Young | G06Q 50/01 705/7.42 |
| 2016/0292794 A1* | 10/2016 | Sedayao | G06Q 10/00 |
| 2016/0301651 A1* | 10/2016 | Abou Mahmoud | H04L 51/32 |
| 2016/0321592 A1* | 11/2016 | Zhou | G06Q 10/06393 |
| 2016/0378549 A1* | 12/2016 | Irish | H04L 67/1002 718/107 |
| 2017/0116578 A1* | 4/2017 | Hadatsuki | G06Q 10/1095 |
| 2017/0124504 A1* | 5/2017 | Bastide | G06Q 10/06398 |
| 2017/0155694 A1* | 6/2017 | Pinkovezky | G06F 17/24 |
| 2017/0177722 A1* | 6/2017 | Cavalin | G06F 17/30864 |
| 2017/0243163 A1* | 8/2017 | Vootkur | G06Q 10/1053 |

\* cited by examiner

IDENTIFYING AND PUBLISHING COMPANY MILESTONES IN RESPONSE TO EVENTS GENERATED FROM A SOCIAL NETWORKING SERVICE

TECHNICAL FIELD

The subject matter disclosed herein generally relates to identifying and publishing company milestones in response to events generated from a social networking service, and, in particular, to identifying and publishing these company milestones using a variety of predictive models corresponding to the company milestones, where the generated events are correlated to one or more of the predictive models.

BACKGROUND

Online social networking services provide users with a mechanism for defining, and memorializing in a digital format, their relationships with other people. This digital representation of real-world relationships is frequently referred to as a social graph. Many social networking services utilize a social graph to facilitate electronic communications and the sharing of information between its users or members. For instance, the relationship between two members of a social networking service, as defined in the social graph of the social networking service, may determine the access and sharing privileges that exist between the two members. As such, the social graph in use by a social networking service may determine the manner in which two members of the social networking service can interact with one another via the various communication and sharing mechanisms supported by the social networking service.

The social networking service may support an organization or an individual as a member. When an organization joins as a member, the organization may engage with other individual or organizational members of the social networking service. However, as the social networking service may have millions of members, it may be difficult for the organization to track and monitor events by other individual members or organizational members that may be relevant to the organization. Thus, the organization may miss out on opportunities to broaden a target audience or to enhance its public image with other members of the social networking service.

BRIEF DESCRIPTION OF THE DRAWINGS

Some embodiments are illustrated by way of example and not limitation in the figures of the accompanying drawings.

DETAILED DESCRIPTION

Figure 1:
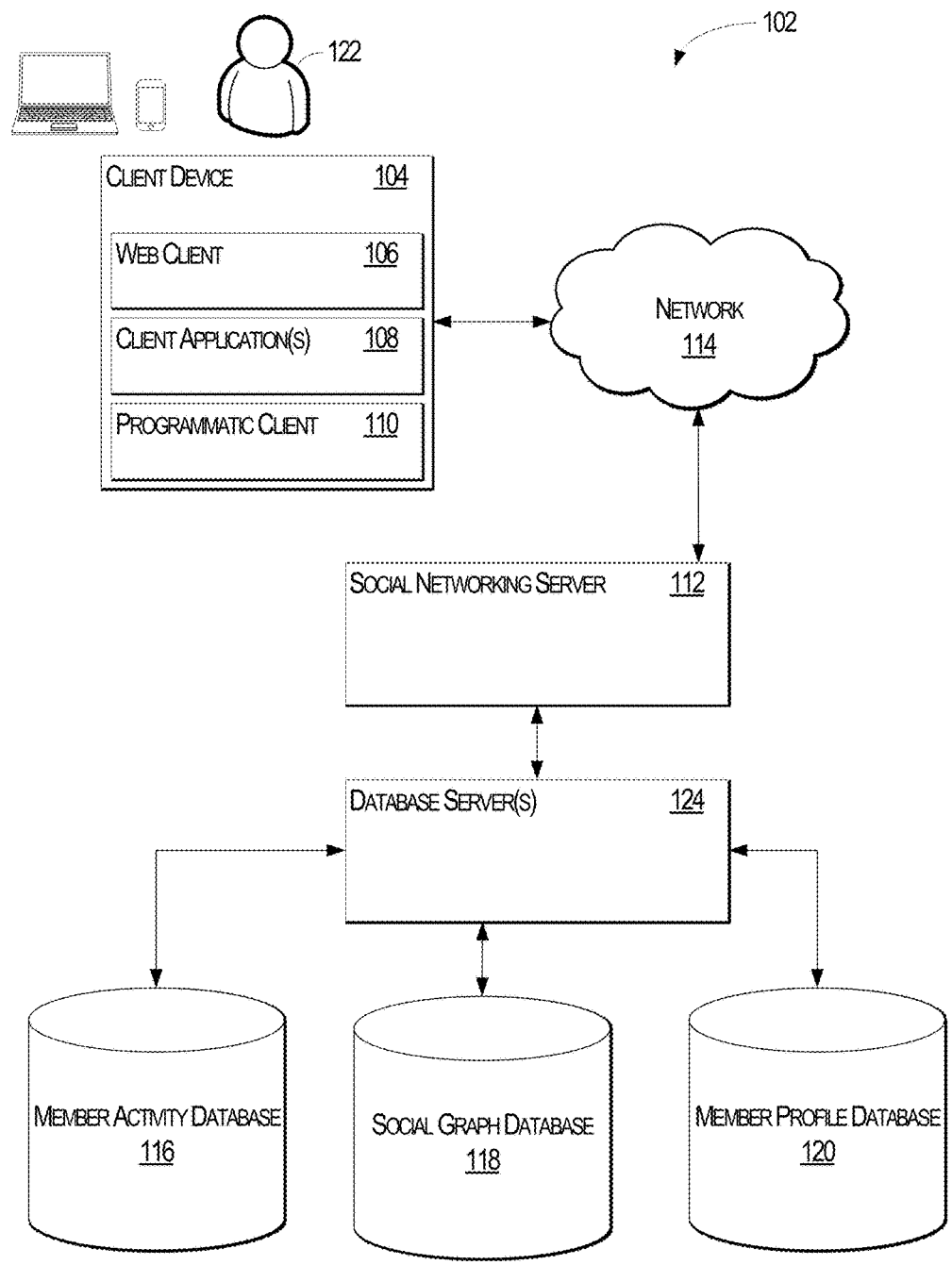
FIG. 1 is a block diagram of a system, in accordance with an example embodiment, for providing a social networking service.

Example methods and systems are directed to monitoring events generated by a social networking service and determining whether the generated events signify a company milestone for an organizational member. The events may be generated by members of the social networking service or by external websites being monitored by the social networking service. The social networking service further conducts various types of processing on content associated with one or more of the events to determine the quality, tone, and relevancy of the monitored events. This processing may depend on whether the event was generated by a member of the social networking service or by an external website. The social networking service then correlates the various monitored events with organizational members of the social networking service. After a predetermined time period or a predetermined number of events, the social networking service then attempts to identify a company milestone that best matches the events.

Accordingly, this disclosure provides, in one embodiment, a system that includes a machine-readable memory storing computer-executable instructions and at least one hardware processor communicatively coupled to the machine-readable memory that, having executed the computer-executable instructions, configures the system to monitor for a plurality of events, at least one event being generated in response to a determination that an entity has performed a predetermined action and analyze content associated with each event of the plurality of events, the content being provided by a web site external to a social networking service. The system is further configured to associate a plurality of analytic result data for each event of the plurality of events in response to the analysis of their corresponding content and determine a predictive milestone model selected from a plurality of predictive milestone models based on the plurality of events, the predictive milestone model indicating a predetermined achievement achieved by an organization associated with the plurality of events. The system is also configured to communicate the predictive milestone model as a company milestone to a plurality of members of the social networking service.

This disclosure also provides a method that includes monitoring for a plurality of events, at least one event being generated in response to a determination that an entity has performed a predetermined action and analyzing content associated with each event of the plurality of events, the content being provided by a website external to a social networking service. The method further includes associating a plurality of analytic result data for each event of the plurality of events in response to the analysis of their corresponding content and determining a predictive milestone model selected from a plurality of predictive milestone models based on the plurality of events, the predictive milestone model indicating a predetermined achievement achieved by an organization associated with the plurality of events. The method also includes communicating the predictive milestone model as a company milestone to a plurality of members of the social networking service.

This disclosure further provides a machine-readable medium comprising computer-executable instructions that, when executed by at least one hardware processor, cause a system to perform the methods described herein.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident, to one skilled in the art, however, that the present subject matter may be practiced without these specific details.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Washington State), an application 108, and a programmatic client 110 executing on client device 104. The social networking server 112 is further communicatively coupled with one or more database servers 124 that provide access to one or more databases 116-120.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronics, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, Global Positioning System (GPS) devices, and so forth. The client device 104 may be a device of a user 122 that is used to perform one or more searches for user profiles accessible to, or maintained by, the social networking server 112.

In one embodiment, the social network server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 122, to identify or locate other connected members, etc.). Conversely, if the social networking server access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the network architecture 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is, of course, not limited to such an architecture, and could equally well find application in a distributed, or peer-to-peer, architecture system, for example.

In addition to the client device 104, the social networking server 112 communicates with other one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, a graph database, one or more flat files, or combinations thereof. Examples of graph databases include, but are not limited to, Neo4j, which is available from Neo Technology, Inc., Giraph, which is available from The Apache Software Foundation, and GraphLab, which is available from Dato, Inc.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120.

Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

For members associated with an organization, the member profile database 120 may include an identification as to whether a given member is authorized to act on the organization's behalf. Thus, the authorized member may disseminate information, endorsed by the organization, to other members of the social networking service. In this manner, an organization may inform other members of the social networking service, individuals and organizations, of news and/or events that may be relevant to the organization. For example, the organization may disseminate information about a new product, an industry event, a news item, or other information to other members of the social networking service. The organization may also disseminate such information to members of the social networking service that have elected to "follow" the organization or have elected to subscribe to information provided by the organization.

Members of the social networking service provided by the social networking server 112 may establish connections with one or more members and/or organizations of the social networking service. The connections may be defined as a social graph, where the member and/or organization is representative by a node in the social graph and the edges identify connections between nodes. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the nodes representing the members; otherwise, members are said to be "nth"-degree connections where "n" is defined as the number of edges separating two nodes. As an example, two members are said to be "2nd-degree" connections where each of the members share a connection in common, but are not directly connected to one another. In one embodiment, the social graph maintained by the social networking server 112 is stored in the social graph database 118. Although the foregoing discussion refers to "social graph" in the singular, one of ordinary skill in the art will recognize that the social graph database 118 may be configured to store multiple social graphs.

In addition, members of a social graph, including individual members and organizational members, may communicate with each other using a content feed made available and/or accessible by the social networking server 112. As known in the art, a content feed is a data format used for providing users with frequently updated content. The content feed is typically displayed via a webpage accessible by the members of the social network and is often customized according to a given member's member profile. The content feed may be implemented using a variety of technologies, such as Really Simple Syndication (RSS), Atom 1.0, dynamic Cascading Style Sheets (CSS), HTML5, and other such technologies. Unlike an e-mail or electronic bulletin board, a content feed is often displayed and updated on the same webpage that a user is viewing. The content feed may be implemented as a "push" model or fan-out-on-write, where content for the content feed is displayed as it is provided (e.g., from other members) and/or generated (e.g., from the social networking server 112). Additionally or alternatively, the content feed may be implemented as a "pull" model or fan-out-on-load, where content for the content feed is stored by the social networking server 112 and is provided to a given member's content feed at predetermined intervals (e.g., when the member loads his or her personal webpage).

As discussed below, the social networking server 112 leverages the content feed to inform members whether a given organizational member has a reached a predetermined milestone. In addition, the social networking server 112 may use the content feed (or other communication channels, such as e-mail) to validate with selected members whether the organizational member has, in fact, reached the predetermined milestone. The validation of the predetermined milestone becomes a useful tool for the social networking server 112 as it helps shape and refine the predictive models used in determining whether the organizational member reached the predetermined milestone.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In addition, as members interact with the various applications, services, and content via the social networking service, the social networking service generates events in response to such interactions. Each event is associated with an event type, which identifies the type of event that the member generated or caused. Examples of event types include, but are not limited to, a "like" event type, a "share" event type, a "mention" event type, a "comment" event type, a "job change" event type, a "title change" event type, a "new hire" event type, a "new connection" event type, and other such event types. As suggested by the name associated with the event type, the "like" event type is associated with an event where a member "likes" content that has been posted to the social networking service, the "share" event type is associated with an event where a member selects to share posted content with other members, the "mention" event type is associated with an event where a member is mentioned in posted content, and so forth. As discussed below with reference to FIGS. 3-5, the event generated in this manner may include one or more fields that identify the action that generated the event (e.g., the event type) and the content (or a URL to the content) associated with the event. In this disclosure, the events that are monitored and processed are those events being associated with content that mentions, or is associated with, an organizational member of the social networking service.

As discussed below with reference to FIGS. 2-7, the social networking service generates an event in response to a member interacting with the service, such as by selecting a hyperlink or submitting content, which is then stored in an event datastore. In one embodiment, the events are monitored in substantially real-time, such as near the time the event was generated. In another embodiment, the events are monitored at periodic time intervals, such as by monitoring the event datastore for added events.

In one embodiment, the social networking server 112 communicates with the various databases 116-120 through one or more database server(s) 124. In this regard, the database server(s) 124 provide one or more interfaces and/or services for providing content to, modifying content, removing content from, or otherwise interacting with the databases 116-120. For example, and without limitation, such interfaces and/or services may include one or more application programming interfaces (APIs), one or more services provided via a service-oriented architecture (SOA), one or more services provided via a REST-oriented architecture (ROA), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

One of ordinary skill in the art will recognize that the database server(s) 124 may include one or more different types of servers. For example, the database server(s) 124 may include a Microsoft® Exchange Server, a Microsoft® Sharepoint® Server, a Lightweight Directory Access Protocol (LDAP) server, any other server configured to provide user profile information, or combinations thereof. Accordingly, and in one embodiment, the servers in communication with the social networking server 112 are configured to access the various databases 116-120 and retrieve or store corresponding information.

Figure 2:
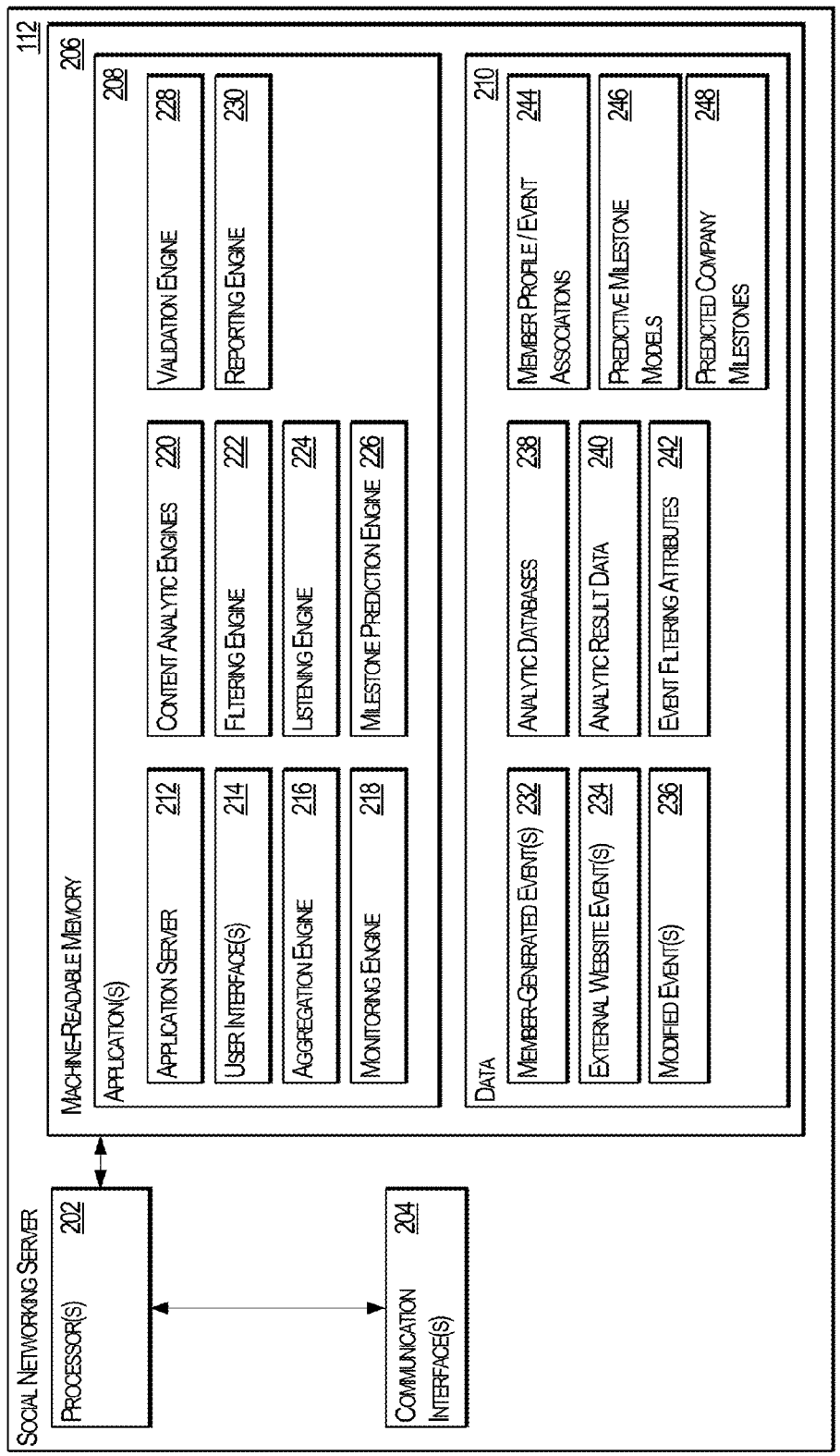
FIG. 2 is a block diagram illustrating the social networking server shown in FIG. 1, in accordance with an example embodiment.

FIG. 2 illustrates the social networking server 112 of FIG. 1, in accordance with an example embodiment. In one embodiment, the social networking server 112 includes one or more processor(s) 202, one or more communication interface(s) 204, and a machine-readable memory 206 that stores computer-executable instructions for one or more application(s) 208 and data 210 used to support one or more functionalities of the applications 208.

The various functional components of the social networking server 112 may reside on a single device or may be distributed across several computers in various arrangements. The various components of the social networking server 112 may, furthermore, access one or more databases (e.g., databases 116-120 or any of data 210), and each of the various components of the social networking server 112 may be in communication with one another. Further, while the components of FIG. 2 are discussed in the singular sense, it will be appreciated that, in other embodiments, multiple instances of the components may be employed.

The one or more processors 202 may be any type of commercially available processor, such as processors available from the Intel Corporation, Advanced Micro Devices, Texas Instruments, or other such processors. Further still, the one or more processors 202 may include one or more special-purpose processors, such as a field-programmable gate array (FPGA) or an application specific integrated circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors 202.

The one or more communication interfaces 204 are configured to facilitate communications between the social networking server 112, the client device 104, and one or more of the database server(s) 124 and/or database(s) 116-120. The one or more communication interfaces 204 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable memory 206 includes various applications 208 and data 210 for implementing the social networking server 112. The machine-readable memory 206 includes one or more devices configured to store instructions and data 210 temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable memory" should be taken to include a single medium or multiple media (e.g., a centralized or distributed database, or associated caches and servers) able to store the applications 208 and the data 210. Accordingly, the machine-readable memory 206 may be implemented as a single storage apparatus or device, or, alternatively and/or additionally, as a "cloud-based" storage systems or storage networks that include multiple storage apparatus or devices. As shown in FIG. 2, the machine-readable memory 206 excludes signals per se.

In one embodiment, the applications 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the applications 208 of the social networking server 112 include, but are not limited to, modules or applications for interacting with the social networking server 112, such as an application server 212 and a user interface application 214. The applications and/or modules also include applications and/or modules for monitoring and aggregating generated events, such as an aggregation engine 216 and a monitoring engine 218. The social networking server 112 further includes applications and/or modules for analyzing content associated with the generated events, such as one or more content analytic engines 220, a filtering engine 222, and a listening engine 223. The application(s) 208 further include one or more applications and/or modules for predicting that an organizational member has reached a predetermined milestone (e.g., a defined event or characteristic), such as a milestone prediction engine 226 and a validation engine 228. Finally, the social networking server 112 includes a reporting engine 230 that generates notifications relating to the determination of whether the organizational member has reached one or more predetermined milestones.

The data 210 supporting these applications 208 include, but are not limited to, member-generated events 232, external website events 234, modified events 236, one or more analytic databases 238, analytic result data 240, one or more event filtering attributes 242 for filtering the modified events 236, one or more member/event associations 244, various predictive milestone models 246 for determining whether an organizational member has reached a predetermined milestone, and one or more predicted company milestones 248, which may include one or more predicted company milestones for a corresponding organizational member or different predicted company milestones for different organizational members.

The application server 212 is configured to provide access to one or more applications 208 of the social networking server 112. For example, the social networking server 112 provides access to one or more user interface applications 214 that provide various graphical interfaces to the one or more client devices 104. In one embodiment, the graphical user interfaces are provided using the Hypertext Transfer Protocol (HTTP). The graphical user interfaces are displayable by the client device 104 and accept input from the user 122 for interacting with the social networking server 112. Further still, the user interface applications 214 may be configured to provide such interfaces to one or more clients displayable by the client device 104, such as the web client 106, one or more client applications 108, or the programmatic client 110. In one embodiment, the user interface applications 214 provide content to the one or more client devices 104 in the form of predicted milestones and/or questions relating to whether a given organizational member has reached or obtained the one or more predicted milestones. As discussed below with reference to FIGS. 6-7, the social networking server 112 may communicate the predicted milestone in one or more content feeds of members that have a unilateral or bilateral connection with the organizational member.

In providing the predicted milestone, the application server 212 and the user interface application 214 interact with other applications 208 of the social networking server 112, such as the reporting engine 230 and the content analytic engines 220. The application server 212 and the user interface application 214 also retrieve and store various types of data 210, such as one or more modified events 236, analytic result data 240, one or more event filtering attributes 242, and one or more member/event associations 244.

The aggregation engine 216 is configured to retrieve various items of content provided by one or more external websites controlled by third-parties. In this context, the social networking server 112, via the aggregation engine 216, treats the publication and/or availability of content from the external websites as "events." Accordingly, examples of events in this context include the publication of a news article by a news website, the publication of the video by the news website or a video hosting website, the publication of an image file or audio file by a third-party website, and other such publications. Furthermore, the publication of the content should be considered as merely one manner in which the aggregation engine 216 may define an event; in other instances, the aggregation engine 216 may define an event as identifying content as "new" to the aggregation engine 216 (e.g., an item of content not having been previously encountered). In one embodiment, the aggregation engine 216 is implemented as an API to a feed reader or blog reader, such as Feedly, which is available via the website of feedly.com. In an alternative embodiment, the aggregation engine 216 is implemented as a stand-alone client executable by the one or more processors 202, such as LinkedIn Pulse, which is available from LinkedIn.com.

Referring briefly to the data 210, the events aggregated by the aggregation engine 216 are stored as the external website events 234. Similarly, events generated by members of the social networking service provided by the social networking server 112 are stored as the member-generated events 232. As discussed above with regard to FIG. 1 and the member activity database 116, the social networking service monitors and stores events generated by the members of the social networking service. Although the events generated by members and third-parties are stored in one or more datastores, the social networking server 112 processes each of these two different types of events through different processing pipelines, which is the discussed below with reference to FIGS. 3-5.

The monitoring engine 218 is configured to monitor events generated by members of the social networking service or by the third-party websites. In one embodiment, the monitoring engine 218 monitors events in a near real-time basis, detecting an event as a new event each time the event is added to the event datastore. In an alternative embodiment, the monitoring engine 218 detects whether events added to the event datastore are new events on a periodic basis (e.g., every five minutes, every 10 minutes, once an hour, etc.). When a new event is detected, the monitoring engine 218 is configured to communicate or transfer the detected event to a pipeline of analytic engines for additional processing. In one embodiment, the social networking server 112 establishes a pipeline for processing member-generated events 228 and a pipeline for processing events generated by 3rd-parties. As discussed below, the processing of a given event yields a modified event (e.g., the modified events 232), where the modified event includes additional analytic result data 236 to facilitate a determination of whether the event should be used in determining whether one or more of the predictive milestone models 246 apply to a given organizational member. In one embodiment, the monitoring engine 218 is implemented as LinkedIn® Burrow™, which is available from LinkedIn Corp. As another example, the monitoring engine 218 is implemented as Logstash, which is available from the Elasticsearch BV Corporation, located in Amsterdam, the Netherlands.

The content analytic engines 220 include various engines configured to analyze the content associated or corresponding to an event. As discussed below with reference to FIG. 4, these engines include a qualitative engine, a tone analytic engine, and an event update engine. These engines analyze the content corresponding to an event and assign a value or identifier that indicates the quality of the content, the tone of the content, whether one or more member profiles are associated with the content, and the overall relevance of the content. The content analytic engines 220 retrieve and store data 210 from various analytic databases 238, such as a qualitative database and a tone database. Each of these engines 220 and databases 238 are discussed further below with reference to FIG. 4.

After processing, a given event is modified to include analytic result data. In one embodiment, this analytic result data is stored as analytic result data 240. The analytic result data 240 is then used by a filtering engine 222 to determine whether the corresponding event is to be communicated to the listening engine 224 for categorization/classification into one or more categories and/or classifications. In making this determination, the filtering engine 222 leverages one or more event filtering attributes (e.g., event filtering attributes 242) established by an administrator of the social networking server 112 in making this determination. In this way, the administrator can establish one or more attributes 242 that indicate whether a given event should be included in the determination of whether a given set of activities (e.g., events) invoke one or more of the predictive milestone models 246.

The listening engine 224 is configured to listen for events having passed the filtering engine 222. As discussed below with reference to FIG. 5, the listening engine 224 includes various modules configured to handle events associated with specific event types (e.g., an employment-related event, a relationship-related event, a sharing event, a mention event, etc.). In one embodiment, the listening engine 224 is implemented as Apache Flume™, which is available from The Apache Software Foundation. In other embodiment, the listening engine 224 is implemented as LinkedIn® Burrow™.

While FIG. 1 illustrates a single block for the listening engine 224, in alternative embodiments, the social networking server 112 may instantiate a listening engine 224 for each of the member profiles of the social networking service. Additionally or alternatively, the social networking server 112 may instantiate one or more listening engines 224 for selected member profiles, such as organizational member profiles. In this way, an organizational member is associated with a corresponding listening engine 224, which handle events associated with, or corresponding to, the organizational member. As events are processed by the listening engine 224, an association is established between the processed event and the corresponding member. Accordingly, such associations are stored as the member/event associations 244. These associations are then stored in a member/event association database, which is leveraged by the milestone prediction engine 226, the validation engine 228, and the reporting engine 226 in communicating to other members when a given organizational member has achieved a predetermined company milestone and/or to validate whether the social networking server 112 has accurately predicted that the given organizational member has achieved the predetermined company milestone.

The milestone prediction engine 226 is configured to determine whether a given member, such as an organizational member, has achieved one or more company milestones defined by the predictive milestone models 246. In one embodiment, a predictive milestone model outputs the probability that a given organizational member has achieved a given milestone when provided with one or more events, such as the member-generated event(s) 232 and the modified event(s) 236 (e.g., the external website event(s) 234 that have been modified by one or more of the content analytic engines 220). A predictive milestone model may be implemented as a two-dimensional probability table, where the columns represent particular event types and the rows represent probabilities that a given combination of events correspond to the predictive milestone model. Examples of milestones may include the hiring of a given number of employees, the acquisition or merger with another organization, the creation of a new organization, establishing a partnership with another organization, adding another organization as a customer, or other such milestone.

In this manner, when a given set of events are provided as input to the milestone prediction engine 226, the milestone prediction engine 226 determines, or outputs, a probability the given set of events correspond to one or more of the predictive milestone models 246. Depending on which of the predictive milestone models 246 have a given probability (e.g., exceed a predetermined probability threshold, such as 90%), the milestone prediction engine 226 then selects the one or more predictive models 246 as the predicted company milestones 248.

In some instances, it may be unclear whether a selected organizational member has, in fact, achieved the predicted company milestones 248. For example, when the social networking server 112 is initially building the predictive milestone models 246, there may be instances where a given set of events appear to correspond to one predictive milestone (e.g., establishing a customer relationship with another organization) but the given set of events actually correspond to a different predictive milestone (e.g., being acquired by another organization). In this regard, the social networking server 112 may attempt to validate whether the predicted company milestones 248 have occurred for a given organization relative to the set of events that were provided as input to the milestone prediction engine 226.

Accordingly, in one embodiment, the validation engine 228 is configured to validate whether one or more predicted company milestones 248 is/are the correct predicted company milestones 248 in view of a given set of events (e.g., member-generated events 232 and/or modified events 236). To validate the predicted company milestones 248, the validation engine 228 may communicate one or more questions to member profiles selected from the member profile database 120. The validation engine 228 may select a member profile based on a variety of factors, such as whether the member profile indicates that the member is an employee of the given organizational member, whether the member is an employee of the organizational member, whether the member has a unilateral or bilateral connection with the organizational member, and other such factors. The responses to the communicated questions are then used to modify and/or revise the predictive milestone models 246. For example, the number and/or types of events associated with a given predictive milestone model may be modified (e.g., increased, decreased, and/or removed) in response to the validation operations performed by the validation engine 228.

The reporting engine 230 is configured to communicate the predicted company milestones 248 to one or more members of the social networking server 112. In one embodiment, the reporting engine 230 communicates the predicted company milestones 248 for corresponding organizational members to members of the social networking server 112 that have a connection (e.g., unilateral or bilateral) with the organizational member. For example, the predicted company milestone may be communicated in the content feed associated with a given member. In this manner, when the social networking server 112 determines that an organizational member has reached a predetermined company milestone, this determination can be communicated to other members of the social networking server 112.

Figure 3:
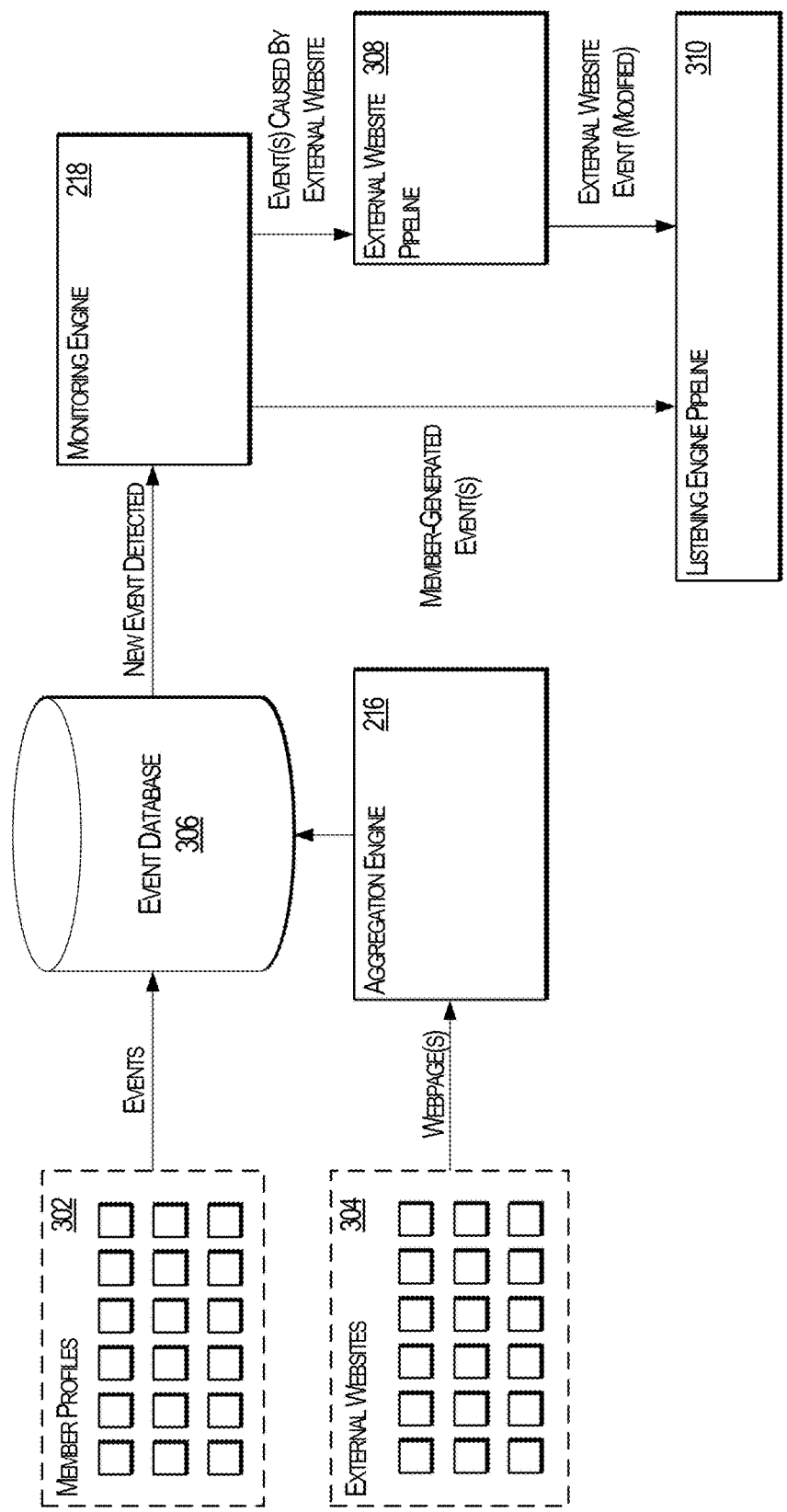
FIG. 3 is a block diagram illustrating directing generated events to a listening engine pipeline, in accordance with an example embodiment.

FIG. 3 is a block diagram illustrating directing generated events to a listening engine pipeline 310, in accordance with an example embodiment. As shown in FIG. 3, the members associated with the member profiles 302 of the social networking service generate events. As discussed previously, such events may be generated by performing a "like" action, posting a status update, indicating a change in employment (e.g., being promoted or changing employers), commenting on a post or status update submitted by another member, and other such actions. The external websites 304 also generate events which are detected and monitored by the aggregation engine 216. In the embodiment shown in FIG. 3, the events generated by the external website 304 correspond to publicly available webpages. However, the events may also include the posting or providing of audiovisual content, such as videos, images, podcasts or audio files, and other such audiovisual content. The events generated by the members of the social networking service and the external websites 304 are communicated to an event database 306, which is communicatively coupled to the social networking server 112 either directly or via one or more database servers 124.

In one embodiment, the event database 306 stores event records, where an event record includes one or more of the following event record fields: an originating member profile identifier, a member profile identifier corresponding to the member acting on the content associated with the event, one or more member profile identifiers corresponding to organizational or personal members linked (e.g., having been mentioned or associated with) to the event, a hyperlink or URL to the content associated with the event, the type of action that caused or generated the event, and/or any external websites 304 associated with the event (e.g., the external website 304 from which content associated with the event originates). The foregoing event record fields are meant to be illustrative and not exhaustive, and one of ordinary skill in the art may include alternative or different event record fields without departing from the scope of this disclosure.

As events are added to the event database 306, the monitoring engine 218 monitors for the new events. As discussed above, the monitoring engine 218 may monitor the additions in real-time or near real-time. In an alternative embodiment, or in some instances, the monitoring engine 218 may periodically monitor the event database 306, such as by determining whether new events have been added to the event database 306 at periodic intervals (e.g., every five minutes, every 30 minutes, once a day, and other such intervals of time). When a new event is detected, the monitoring engine 218 determines whether the event is a member-generated event 228 or an event generated by an external web site 304. In one embodiment, the monitoring engine 218 makes this determination by analyzing one or more event record fields of the event record such as the originating member profile identifier or the external website field. Where the event is generated by an external website 304, the originating member profile identifier may be null, which signals to the monitoring engine 218 that the event was generated by an external website 304. In an alternative embodiment, the event record includes an origination field that indicates whether the event was generated by a member of the social networking service or by an external website 304.

Where the event is generated by a member, the monitoring engine 218 communicates the events to a listening engine pipeline 310, which includes various engines and modules for processing the member-generated event. Additional details regarding the listening engine pipeline 310 is discussed with reference to FIG. 5. Alternatively and/or additionally, where the event is generated by an external website 304, the monitoring engine 218 communicates the event to an external website pipeline 308, which includes designated analytic engines communicatively coupled together to form the external website pipeline 308.

Figure 4:
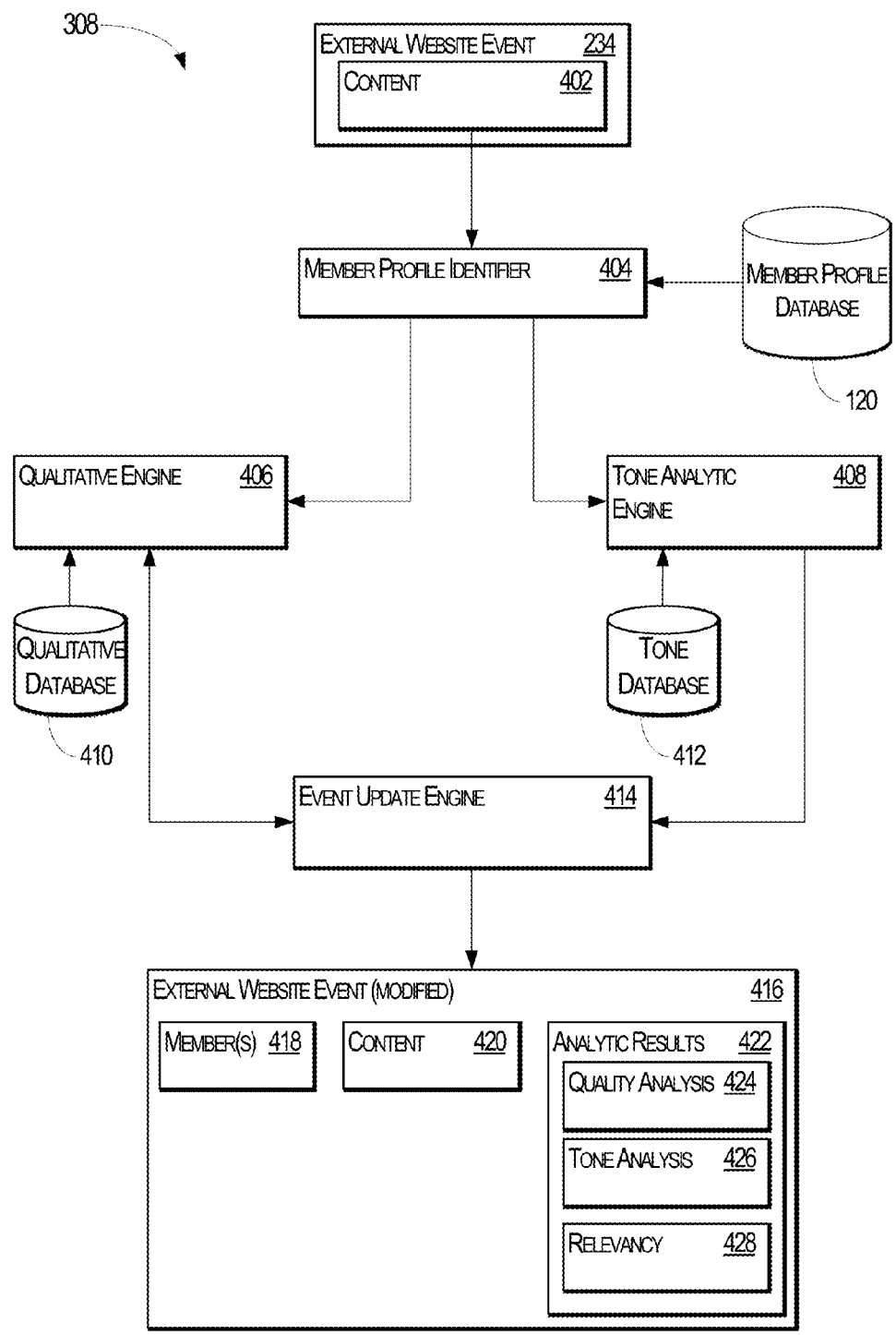
FIG. 4 is a block diagram illustrating an external website pipeline for processing a third-party-generated event, in accordance with an example embodiment.

FIG. 4 is a block diagram illustrating the external web site pipeline 308 for processing a third-party-generated event, in accordance with an example embodiment. As shown in FIG. 4, the external website pipeline 308 includes a member profile identifier 404 communicatively coupled to a qualitative engine 406 and a tone analytic engine 408. The qualitative engine 406 and the tone analytic engine 408 are each communicatively coupled to the event update engine 414. The external web site pipeline 308 receives an external web site event 234 and outputs a modified external web site events 416.

In one embodiment, the member profile identifier 502 is configured to determine whether the content 402 of the external web site event 234 mentions or references a member having a profile with the social networking service. In this regard, the member profile identifier 502 performs natural language processing on the content 510 to identify nouns or proper names, and then cross-references the identified nouns or proper names with the member profile database 120. Where an identified noun or proper name corresponds to a member profile of the member profile database 120, the member profile identifier 404 includes a field or "tag" identifying the corresponding member. In one embodiment, the field references a member profile identifier (e.g., a key corresponding to the member profile record of the member profile database 120); however, in alternative embodiments, the field references the member profile name or acronym. In this manner, the member profile identifier 404 identifies whether the external website event 234 is to be associated with one or more member profiles in view of the content 402 (e.g., a news article, a blog posting, an opinion piece) associated with the event 234.

While, in one embodiment, the member profile identifier 404 performs natural language processing on the content 402, the member profile identifier 404 may perform other operations depending on the content type. For example, where the content 402 is an image, the member profile identifier 404 performs optical character recognition or image recognition on the content 402 to determine whether it references or mentions a member of the social networking service. As another example, where the content 402 is an audio file, the member profile identifier 404 performs voice or speech recognition on the audio file and the results of the voice or speech recognition (e.g., a text transcript) are then provided as input to the natural language processing portion of the member profile identifier 404. Various optical character recognition techniques and voice recognition techniques are known to one of ordinary skill in the art of video and audio processing.

The external website pipeline 308 also includes a qualitative analysis of the content 402 performed by a qualitative engine 406. In one embodiment, the qualitative engine 406 is configured to determine the quality of the content 402, which can be used as an indicator in determining whether the external website event 234 should be used in determining a predictive milestone model. One example of a qualitative engine 406 is LinkedIn® Pinot™, which is available from LinkedIn Corp.

In one embodiment, the qualitative engine 406 assigns a quality analysis value to the external website event 234 according to the originating source of the content 402. In this regard, the qualitative engine 406 leverages a qualitative database 410, which includes one or more records indicating the quality of various origination sources. An origination source (or origin source) is the source from which the content 402 originates or from which one or more articles mentioned or linked in the content 402 originates. In one embodiment, the rows of the qualitative database 410 correspond to websites from which content 402 is available, and each row is associated with a quality score. In some instances, the quality score may be positive or negative. For example, a first website may have a positive score, which indicates that the first website provides relatively high quality content 402, whereas a second website may have a negative score, which indicates that the second website provides relatively low quality content 402. In alternative instances, this quality score may take on a range of values, such as from 0 to 100. In this alternative example, a website having a low score indicates that the website provides low-quality content 402 whereas a website having a high score indicates that the website provides high-quality content 402.

While the quality score may be subjective, this quality score may be assigned using various techniques, such as crowdsourcing techniques where members of the social networking service are asked or requested to provide values or scores to selected websites. Another technique is where editors or operators of the social networking service assign scores manually to the qualitative records of the qualitative database 410. Yet a further technique is to employ an API to retrieve review scores from review aggregation websites that provide a measure of quality for sources of content. Furthermore, multiple techniques may be employed, such as where the crowdsourcing technique fails to attract a predetermined threshold number of responses (e.g., 50% of the members of the social networking service) or where the review aggregation website has not yet reviewed a particular source of content 402.

Where the external website event 234 includes content 402 from a single origination source, the qualitative engine 406 assigns a quality analysis value to the external website event 234 corresponding to the quality value associated with the single origination source. However, in many instances, the content 402 will include articles or audiovisual content from different originating sources (e.g., where the member links to, comments on, or mentions content 402 provided from different websites). In these instances, the quality analysis value assigned to the external website event 234 is a combination of the quality values for the various originating sources. In one embodiment, this combination is a summation of the quality values. However, other combinations are also possible, such as by applying a weighting factor to the quality value assigned to particular originating sources (e.g., sources associated with a quality value over a predetermined threshold may be assigned a weighting factor of 0.5 or greater) to increase the overall quality analysis value applied to the external website event 234 in a situation where there may be one or more lower quality originating sources associated with the content 402. The quality analysis value may also be an average of the quality values corresponding to the originating sources associated with the content 402. In this manner, the qualitative engine 406 assesses the quality of the content 402 associated with the external website event 234 in instances where a single originating source is mentioned or where multiple originating sources are mentioned.

The tone analytic engine 408 is configured to assign a tone analysis value to the external website event 234. The tone analysis value signals whether the tone of the content 402 is generally positive or generally negative. In this regard, the tone analytic engine 408 references to tone database 412 where the tone database 412 stores one or more records, where each record includes a word or phrase and is associated with a corresponding value (e.g., a positive value or a negative value). For instance, the word "excellent" can be associated with a positive value whereas the phrase "poor performance" can be associated with a negative value. In this regard, the tone analytic engine 408 performs natural language processing on the content 402, including articles linked to or mentioned by the content 402, to assess whether the external web site event 234 is a generally positive event or a negative event.

In context, the tone determined by the tone analytic engine 408 may affect the predictive milestone determined by the milestone prediction engine 226. For example, one or more of the predictive milestone models 246 may be configured with tonally negative and/or tonally positive events. Thus, whether the external website event 234 is a negative or positive event may affect which of the predictive milestone models 246 are selected by the milestone prediction engine 226.

In determining whether an external website event 234 is positive or negative, the tone analytic engine 408 or the social networking server 112, may establish a gradient scale (e.g. a scale of 0 to 1, a scale of 0 to 100, a scale of 0 to 1000, etc.), where various ranges along the gradient scale correspond to various types of positive values or negative values. For example, where the scale is 0 to 100, a value in the range of 0 to 10 may indicate that the external website event 234 is predominantly negative whereas a value in the range of 90 to 100 may indicate that the external website event 234 is mostly or greatly positive. In calculating this value, the tone analytic engine 408 may perform a summation of the various values corresponding to identified words or phrases in the content 402, which includes comments or remarks made by the member and any articles or items of interest linked or mentioned. In this manner, the tone analytic engine 408 facilitates the selection of a predictive milestone model according to the tone of one or more external website events 234.

After the external website event 234 is analyzed and processed, the event update engine 414 updates the external website event 234. In one embodiment, updating the external website event 234 includes modifying the structure of the external website event 234 to include an additional set of analytic results 422. The analytic results 422 may include a quality analysis value 424, a tone analysis value 426, and a relevancy value 428. In one embodiment, the relevancy value 428 is determined from the quality analysis 424, the tone analysis 426, or both. In this context, the relevancy value 428 serves as an overall measure for the modified external website event 234. This overall measure may be used by one or more engines in selecting a predictive milestone model. In particular, the relevancy value 428 may serve as a measure for whether a given event is relevant relative to the organizational member for which the predictive milestone model is being selected.

For example, the contents associated with an external website event 234 may be overwhelmingly positive and may have been linked or mentioned by other members (e.g., the content 402 is trending among 2% of the members of the social networking service). These two characteristics would initially seem to indicate that the content 402 would may suggest that the corresponding organizational member may have reached or achieved a particular milestone. However, the originating sources of the content 402 may be known to be low quality sources or sources known to provide false or misleading content. Accordingly, the quality analysis value 424 will be a low or lower value, and this value would reduce or diminish the relevancy value 428. Thus, the relevancy value 428 may serve as an additional metric that the predictive milestone engine 226 can use to filter out certain types of external website events 234.

Figure 5:
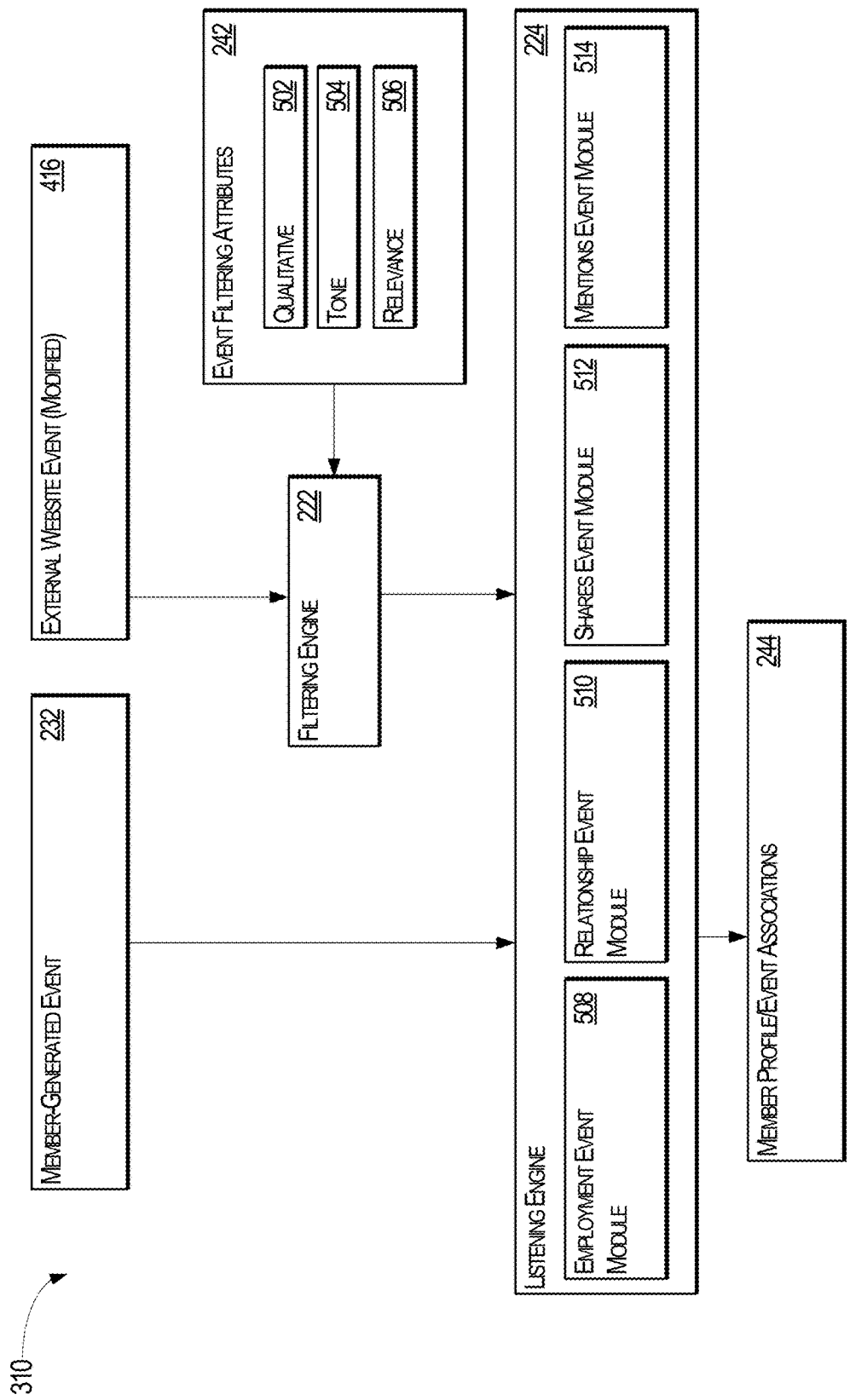
FIG. 5 is a block diagram illustrating the listening engine pipeline of FIG. 3, in accordance with an example embodiment.

The member-generated events 232 and the modified external website events 416 are then processed in a listening engine pipeline 310. FIG. 5 is a block diagram illustrating the listening engine pipeline 310 of FIG. 3., in accordance with an example embodiment. As shown in FIG. 5, the filtering engine 222 receives as input the modified external website event 416 and applies one or more event filtering attributes 242 to filter out the modified external website events 416.

Initially, the filtering engine 222 determines which organizational members associated with the modified external website event 416. In this regard, the filtering engine 222 references the member profile identifiers (e.g., determined by the member profile identifier 404 of FIG. 4) of the modified external website events 416 to identify the organizational members referenced or associated with the external website event 416. The filtering engine 222 then identifies an organizational profile (e.g., selected from the member profile database 120) corresponding to the identified organizational member to determine which event filtering attributes 242 are associated with the identified organizational member.

In this manner, the filtering engine 222 performs an initial assessment to determine which set or sets of event filtering attributes 242 to retrieve to filter out the incoming external website events 416. The filtering engine 222 then applies the retrieved set or sets of event filtering attributes 242 to the incoming external website events 416.

In one embodiment, the event filtering attributes 242 are established or defined by an administrator of the social networking server 112. Examples of the event filtering attributes 242 include a qualitative attribute 502, a tone attribute 504, a trending attribute 506, and a relevance attribute 508. Each of the event filtering attributes 242 effectively establish a threshold by which corresponding values associated with the modified external website events 416 are compared. Thus, for one or more of the incoming events 416, the qualitative attribute 502 is compared with the quality analysis value 424, the tone attribute 504 is compared with the tone analysis value 426, and the relevance attribute 506 is compared with the relevancy value 428.

While the filtering engine 222 may compare each of the analytic results 422 of a modified external web site event 416 with the various attributes 502-506, an administrative of the social networking server 112 may configure the event filtering events 242 in any combination of comparisons. Thus, the administrator may define that only a single attribute (e.g., the qualitative attribute 502) should be evaluated. In this manner, the administrator has a high degree of flexibility in determining the type of event he or she prefers to be included in the determination of a predicted company milestone. For example, the administrator may establish a low threshold for each of the attributes 502-506, in which case, it is likely that most (if not all) of the events 416 will be included in the predictive company milestone determination. As another example, the administrator may establish a high threshold for each of the attributes 502-506. In this second example the events 416 that are included in the predictive company milestone determination may generally originate from a high quality source, be highly positive with respect to the organizational member associated with the event, and is, overall, a relevant event. In this manner, defining various different thresholds among the various attributes 502-506 provides a degree of control to the administrator in the types of events that are considered when the social networking server 112 determines a predictive company milestone.

After passing the filtering engine 222, the filtering engine 222 communicates the event to the listening engine 224. In one embodiment, an organizational member is assigned to, or associated with, a corresponding listening engine 224. Accordingly, in this embodiment, each organizational member is assigned a listening engine 224 that handles the identification and segregation of events as they are communicated by the filtering engine 222. However, in alternative embodiments, one or more listening engines 224 may be instantiated to handle the identification and segregation of events.

In one embodiment, the listening engine 224 includes a plurality of modules 508-514, where each module 508-514 is dedicated to identifying and handling a specific event type. In alternative embodiments, a single module or a different number of modules 508-514 are deployed.

As shown in FIG. 5, the listening engine 224 includes an employment event module 508 for employment-related events, a relationship event module 510 for relationship-related events, a shares event module 614 for events of the "shares" event type, and a mentions event module 616 for events of the "mentions" event type. In one embodiment, as events are communicated from the filtering engine 222 to the listening engine 224, each of the modules 508-514 parses the event to extract the event type associated with the event. When the corresponding module 508-514 identifies its assigned event type (e.g., the employment-related event module 508 identifies an employment-related event), the identifying module 508-514 then processes the identified event.

While FIG. 5 illustrates that the listening engine 224 includes four modules 508-514 for handling specific event types, the social networking service may support different types of event. Since the social networking service is dynamic and fluid, other event types may be added while the social networking service is in operation. Accordingly, the listening engine 224 implements a modular design in that additional modules may be seamlessly incorporated into the listening engine 224 for detecting other event types. Thus, when a new event type is added to the social networking service, the listening engine 224 can be expanded with a new module that identifies and segregates the added event type.

As mentioned above, when a module 508-514 identifies a corresponding event (e.g., based on the assigned event type), the module 508-514 then processes the event. In one embodiment, processing the event includes updating the member profile/event associations 244. As discussed above, member profile/event associations 244 are those associations between a given member profile and generated events that include a member profile identifier corresponding to the given member profile. In one embodiment, the member profile/event associations 244 are stored in an event database (not shown), which includes multiple database tables that each correspond to an event type identifiable by the listening engine 224. In an alternative embodiment, the database includes a single table that stores associations for all of the events identified by the listening engine 224. Other arrangements of the database are also possible, including varying the number of tables or implementing the database in a structurally different manner (e.g., as flat files or as an object-oriented database).

As the listening engine 224 adds associations to the member profile/event associations 244, the milestone prediction engine 226 is configured to detect and retrieve the events associated with the added associations. In one embodiment, the milestone prediction engine 226 retrieves newly added events at periodic intervals, such as every minute, every 30 seconds, or at any other time interval. In another embodiment, the milestone prediction engine 226 retrieves events based on the number of events associated with a given organizational member profile. For example, the milestone prediction engine 226 may retrieve the events after 200 events have been associated with the organizational member profile. When the milestone prediction engine 226 retrieves a set of events, it then attempts to determine and/or identify a predictive milestone model selected from the predictive milestone models 246.

Figure 6:
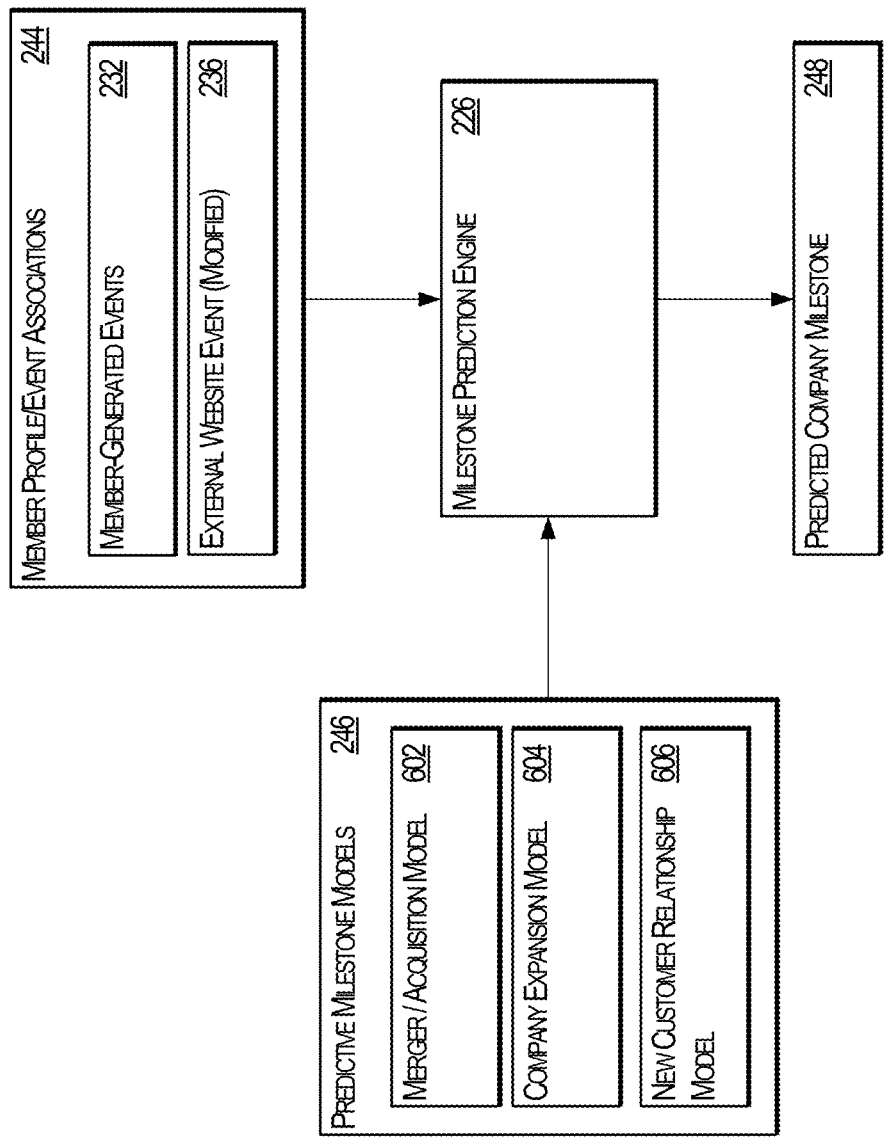
FIG. 6 is a block diagram illustrating the milestone prediction engine of FIG. 2 determining a predicted company milestone, in accordance with an example embodiment.

FIG. 6 is a block diagram illustrating the milestone prediction engine 226 of FIG. 2 determining a predicted company milestone, in accordance with an example embodiment. As shown in FIG. 6, the milestone prediction engine 226 accepts as input the member-generated events 232 and the modified external website events 236 associated with a given organizational member profile. The milestone prediction engine 226 also references the various predictive milestone models 246 to determine whether the various events indicate that the associated organizational member has achieved a particular milestone. As examples of predictive milestone models 246, these models 246 may include a merger/acquisition model 602, which signifies that the organizational member has been acquired or merged with another organization, a company expansion model 604, which signifies that the company has expanded, such as by acquiring another organization, by expanding a product line, or by adding a new product and/or service, and a new customer relationship model 606, which signifies that the organizational member has established a customer relationship with another organization.

When provided with the events from the member profile/event associations 244, the milestone prediction engine 226 attempts to find a best match or fit of the events among the various predictive milestone models 246. Additionally and/or alternatively, the fit may be a "fuzzy" fit, in that the milestone prediction engine 226 may identify or determine a predictive milestone model 246 that best approximates the events with the member profile/event associations 244. The milestone prediction engine 226 may further associate a determined probability that the events from the member profile/event associations 244 matches or fit one or more of the predictive milestone models 246 (e.g., a 50% probability, an 85% probability, etc.). The probability and the determined predictive milestone model may then be output by the milestone prediction engine 226 as the predicted company milestone 248.

Figure 7:
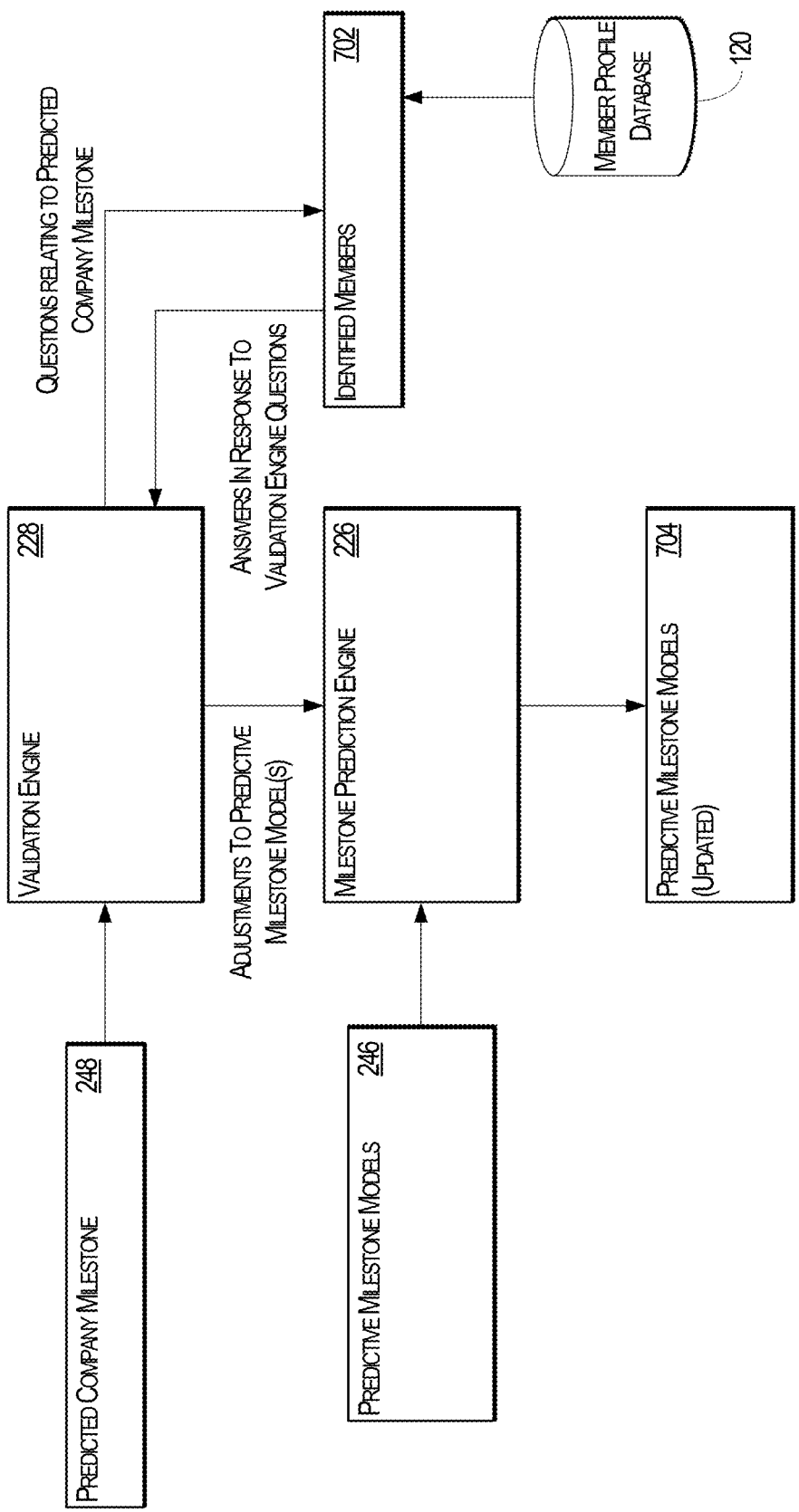
FIG. 7 illustrates a block diagram of validating the predicted company milestone, in accordance with an example embodiment.

There may be instances where a set of events yields a false positive for one or more of the predictive milestone models 246. Accordingly, the social networking server 112 supports validation of the determined predicted company milestone 248. FIG. 7 illustrates a block diagram of validating the predicted company milestone 248, in accordance with an example embodiment. In one embodiment, the validation engine 228 accepts as input the predicted company milestone 248. The validation engine 228 then communicates one or more questions to various identified members 702, whose member profiles have been selected from the member profile database 120. In one embodiment, the identified members 702 are identified according to one or more connections, direct or indirect, they have with the organizational member(s) associated with the predicted company milestone 248. The questions communicated by the validation engine 228 may be selected from a questionnaire database (not shown) associated with the predicted company milestone 248. The questions include topics intended to elicit a response from the identified members 702 as to whether one or more events were indicative of the predicted company milestone 248. Each of the identified members 702 may receive the same set of questions, different sets of questions, or various combinations thereof.

The validation engine 248 then receives one or more answers in response to the communicated questions. In one embodiment, the answers may be "Yes" or "No" type answers. In another embodiment, the answers may be explanatory, which may involve an administrator of the social networking server 112 having to review the provided answers.

The answers affect the predictive milestone models 246. In particular, the answers affect whether a given predictive milestone model should be adjusted to include or exclude a given type of event. Additionally or alternatively, the answers affect whether a given predictive milestone model should be adjusted to increase or decrease the number of events for a given type of event associated with a predictive milestone model. As one of ordinary skill in the art will recognize, this process helps to refine the number and/or types of events that signify a potential company milestone. Negative or "No" type answers may decrease the number and/or types of events associated with a given predictive company milestone, whereas positive or "Yes" type answers may increase the number and/or types of events associated with a given predictive company milestone. Furthermore, additional types of events may be added to a given predicted company milestone depending on the answers provided by the identified members 702. These adjustments are communicated by the validation engine 228 to the milestone prediction engine 226. As illustrated in FIG. 7, the milestone prediction engine 226 accepts the adjustments to the predictive milestone models and modifies them accordingly to output the updated predictive milestone models 704. The updated predictive milestone models 704 are then re-integrated into the social networking server 112 and used as the predictive milestone models 246.

In this manner, this disclosure provides systems and methods that that facilitate the monitoring of events associated with an organizational member as those events are caused by members of the social networking service and by entities external to the social networking service. Using the monitored events, the social networking service then generates an output indicating whether the organizational member has achieved a company milestone, whether that company milestone be the hiring of new employees, the acquisition of another company, establishing a customer relationship with another company, or other such company milestone. The technical effect of such systems and methods is that the members of the social networking service are made aware of activities occurring relative to an organizational member as they occur, rather than requiring user interaction or member intervention to learn of such activities. Furthermore, with accurate predictive models, an administrative member of the organizational member may be able to leverage the prediction to direct focus to, or away from, the organizational member.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-readable Medium

Figure 8:
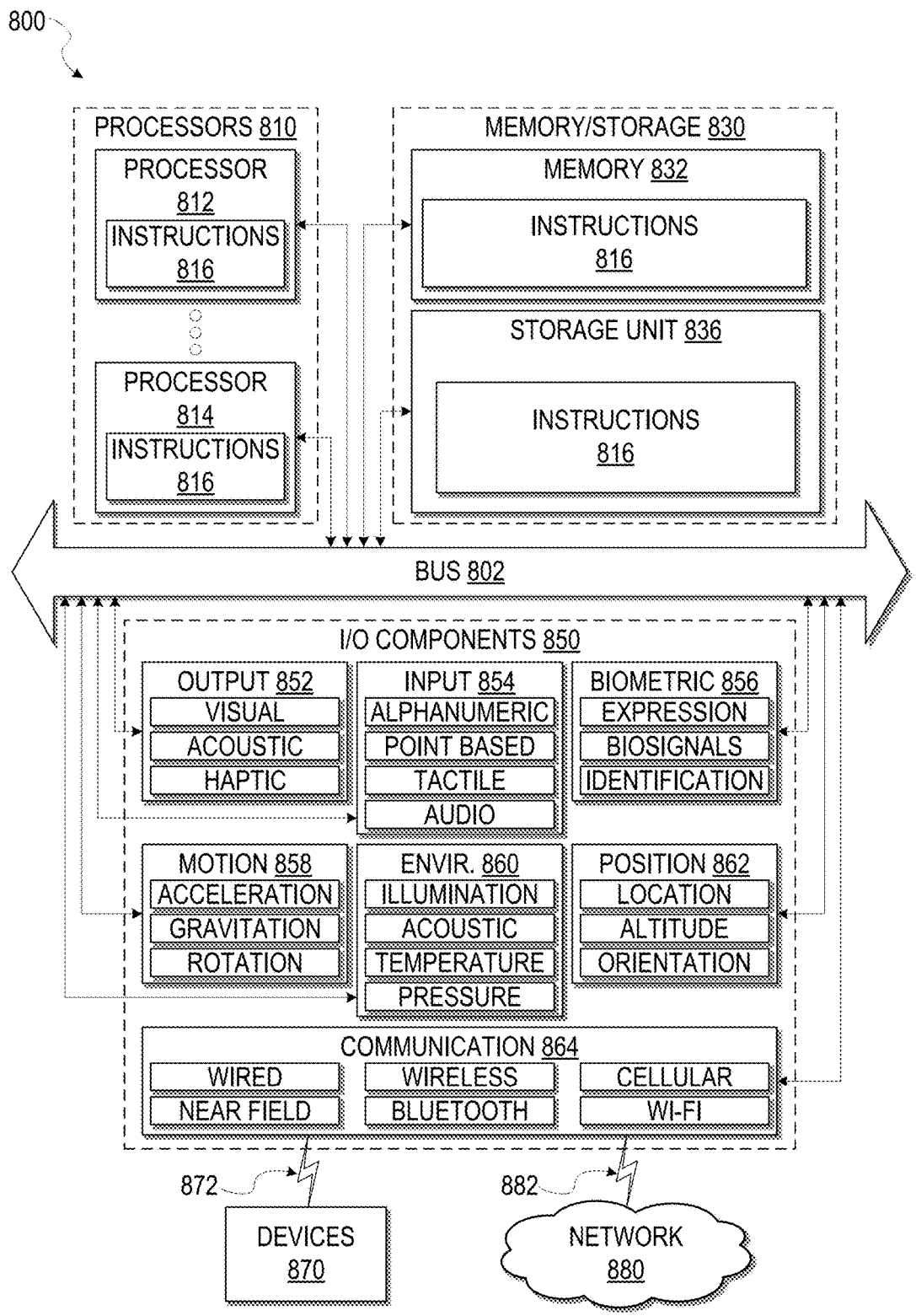
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the operations illustrated in FIGS. 3-7. Additionally, or alternatively, the instructions 816 may implement one or more of the components of FIGS. 1-2. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), or any machine 800 capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 812 and processor 814 that may execute instructions 816. The term "processor" is intended to include multi-core processors 810 that may comprise two or more independent processors 810 (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor), multiple processors 810 with a single core, multiple processors 810 with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines 800 such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable memory storing computer-executable instructions; and
at least one hardware processor communicatively coupled to the machine-readable memory that, having executed the computer-executable instructions, configures the system to:
monitor for a plurality of events, at least one event from the plurality of events being generated in response to a determination that an entity has performed a predetermined action;
for each event of the plurality of events, determine whether the entity that generated the corresponding event was a member associated with a social networking service or an entity represented by a website external to the social networking service;
process a second plurality of events selected from the first plurality of events within an external website pipeline based on the determination that each event of the second plurality of events was generated by the website external to the social networking service, the external website pipeline comprising:
analyzing content associated with each event of the second plurality of events, the content being obtained from the website external to a social networking service; and
modifying each event of the second plurality of events to associate a plurality of analytic result data in response to the analysis;
filter out one or more events from the second plurality of events based on the analytic result data associated with each of the one or more of the events to obtain a third plurality of events;
determine a predictive milestone model selected from a plurality of predictive milestone models based on the third plurality of events, the predictive milestone model indicating a predetermined achievement achieved by an organization associated with the third plurality of events;
communicate the predictive milestone model as a company milestone to a plurality of members of the social networking service;
identify a plurality of members of the social networking service that have a connection in a social graph between a corresponding member profile and a profile corresponding to the organization;
validate the predictive milestone model by communicating a plurality of questions to the identified members of the social networking service, the questions being selected based on the predictive milestone model; and
in response to answers provided by the identified members, modify the predictive milestone model.

2. The system of claim 1, wherein the entity comprises the website external to the social networking service and the predetermined action comprises the website making content publicly available.

3. The system of claim 1, wherein the system is further configured to analyze the content associated with the generated event by performing a tone analysis on the content, the tone analysis resulting in a tone analysis value that indicates the tone of the content.

4. The system of claim 1, wherein the system is further configured to analyze the content associated with the generated event by performing a qualitative analysis on the content, the qualitative analysis resulting in a qualitative analysis value that indicates the quality of the content.

5. The system of claim 1, wherein the system is further configured to filter the plurality of events based on the plurality of analytic result data prior to the determination of the predictive milestone model.

6. The system of claim 1, wherein:
each event selected from the plurality of events is associated with an event type; and
the system is further configured to determine the predictive milestone model based on the plurality of event types and the number of events for each event type.

7. A method comprising:
monitoring, by at least one hardware processor, for a plurality of events, at least one event from the plurality of events being generated in response to a determination that an entity has performed a predetermined action;
for each event of the plurality of events, monitoring whether the entity that generated the corresponding event was a member associated with a social networking service or an entity represented by a website external to the social networking service;
processing, by the at least one hardware processor, a second plurality of events selected from the first plurality of events within an external web site pipeline based on the determination that each event of the second plurality of events was generated by the website external to the social networking service, wherein the external website pipeline comprises;
analyzing, by at least one hardware processor, content associated with each event of the second plurality of events, the content being obtained from the website external to a social networking service; and
modifying each event of the second plurality of events to associate, by the at least one hardware processor, a plurality of analytic result data in response to the analysis;
filtering out one or more events from the second plurality of events based on the analytic result data associated with each of the one or more of the events to obtain a third plurality of events;
determining, by at least one hardware processor, a predictive milestone model selected from a plurality of predictive milestone models based on the third plurality of events, the predictive milestone model indicating a predetermined achievement achieved by an organization associated with the third plurality of events;
communicating, by at least one hardware processor, the predictive milestone model as a company milestone to a plurality of members of the social networking service;
identifying a plurality of members of the social networking service that have a connection in a social graph between a corresponding member profile and a profile corresponding to the organization;
validating the predictive milestone model by communicating a plurality of questions to the identified members of the social networking service, the questions being selected based on the predictive milestone model; and
in response to answers provided by the identified members, modifying the predictive milestone model.

8. The method of claim 7, wherein the entity comprises the website external to the social networking service and the predetermined action comprises the website making content publicly available.

9. The method of claim 7, wherein the method further comprises:
analyzing the content associated with the generated event by performing a tone analysis on the content, the tone analysis resulting in a tone analysis value that indicates the tone of the content.

10. The method of claim 7, wherein the method further comprises:
analyzing the content associated with the generated event by performing a qualitative analysis on the content, the qualitative analysis resulting in a qualitative analysis value that indicates the quality of the content.

11. The method of claim 7, wherein the method further comprises:
filtering the plurality of events based on the plurality of analytic result data prior to the determination of the predictive milestone model.

12. The method of claim 7, wherein:
each event selected from the plurality of events is associated with an event type; and
the method further comprises determining the predictive milestone model based on the plurality of event types and the number of events for each event type.

13. A non-transitory machine-readable medium comprising computer-executable instructions that, when executed by at least one hardware processor, cause a system to perform a plurality of operations, the operations comprising:
monitoring for a plurality of events, at least one event from the plurality of events being generated in response to a determination that an entity has performed a predetermined action;
for each event of the plurality of events, monitoring whether the entity that generated the corresponding event was a member associated with a social networking service or an entity represented by a website external to the social networking service;
processing, by the at least one hardware processor, a second plurality of events selected from the first plurality of events within an external website pipeline based on the determination that each event of the second plurality of events was generated by the website external to the social networking service, wherein the external website pipeline comprises:
analyzing content associated with each event of the second plurality of events, the content being obtained from the website external to a social networking service; and
modifying each event of the second plurality of events to associate a plurality of analytic result data in response to the analysis;
filtering out one or more events from the second plurality of events based on the analytic result data associated with each of the one or more of the events to obtain a third plurality of events;
determining a predictive milestone model selected from a plurality of predictive milestone models based on the third plurality of events, the predictive milestone model indicating a predetermined achievement achieved by an organization associated with the third plurality of events;
communicating the predictive milestone model as a company milestone to a plurality of members of the social networking service;
identifying a plurality of members of the social networking service that have a connection in a social graph between a corresponding member profile and a profile corresponding to the organization;
validating the predictive milestone model by communicating a plurality of questions to the identified members of the social networking service, the questions being selected based on the predictive milestone model; and
in response to answers provided by the identified members, modifying the predictive milestone model.

14. The non-transitory machine-readable medium of claim 13, wherein the entity comprises the website external to the social networking service and the predetermined action comprises the website making content publicly available.

15. The non-transitory machine-readable medium of claim 13, wherein the plurality of operations further comprise:
analyzing the content associated with the generated event by performing a tone analysis on the content, the tone analysis resulting in a tone analysis value that indicates the tone of the content.

16. The non-transitory machine-readable medium of claim 13, wherein the plurality of operations further comprise:
analyzing the content associated with the generated event by performing a qualitative analysis on the content, the qualitative analysis resulting in a qualitative analysis value that indicates the quality of the content.

17. The non-transitory machine-readable medium of claim 13, wherein:
each event selected from the plurality of events is associated with an event type; and the plurality of operations further comprise determining the predictive milestone model based on the plurality of event types and the number of events for each event type.

* * * * *

UNITED STATES PATENT AND TRADEMARK OFFICE
CERTIFICATE OF CORRECTION

PATENT NO. : 10,284,622 B2  
APPLICATION NO. : 15/142375  
DATED : May 7, 2019  
INVENTOR(S) : Margatan et al.

Page 1 of 1

It is certified that error appears in the above-identified patent and that said Letters Patent is hereby corrected as shown below:

In the Claims

In Column 28, Line 32, in Claim 7, delete "web site" and insert --website-- therefor In Column 28, Line 36, in Claim 7, delete "comprises;" and insert --comprises:-- therefor Signed and Sealed this  
Seventeenth Day of March, 2020

Andrei Iancu  
*Director of the United States Patent and Trademark Office*